United States Patent
Campbell et al.

(10) Patent No.: US 8,395,989 B2
(45) Date of Patent: Mar. 12, 2013

(54) METHOD AND SYSTEM FOR NETWORK BACKBONE ANALYSIS

(75) Inventors: Gary L. Campbell, Allen, TX (US); Oommen Mathews, Allen, TN (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 388 days.

(21) Appl. No.: 12/108,233

(22) Filed: Apr. 23, 2008

(65) Prior Publication Data

US 2009/0268605 A1 Oct. 29, 2009

(51) Int. Cl.
*H04L 1/00* (2006.01)
(52) U.S. Cl. ...... 370/225; 370/228; 370/242; 370/395.2
(58) Field of Classification Search .............. 370/395.2, 370/225, 228, 241.255
See application file for complete search history.

(56) References Cited

U.S. PATENT DOCUMENTS

| | | | |
|---|---|---|---|
| 6,108,309 A * | 8/2000 | Cohoe et al. | 370/241 |
| 6,898,188 B1 * | 5/2005 | Hamami | 370/252 |
| 7,324,750 B2 * | 1/2008 | Badt, Jr. | 398/1 |
| 2004/0114513 A1 * | 6/2004 | Badt, Jr. | 370/228 |
| 2006/0274659 A1 * | 12/2006 | Ouderkirk | 370/241 |
| 2008/0123559 A1 * | 5/2008 | Haviv et al. | 370/255 |
| 2008/0219268 A1 * | 9/2008 | Dennison | 370/395.2 |

* cited by examiner

*Primary Examiner* — Jianye Wu
*Assistant Examiner* — Wanda Z Russell

(57) ABSTRACT

A method and system of an embodiment may include receiving network path information identifying one or more network paths, receiving network traffic information specifying a network ingress and a network egress for the network traffic on a first network path of the one or more identified network paths and the network traffic information specifying one or more attributes of the network traffic, emulating failure of one or more components of the first network path, determining a second network path between the specified network ingress and the specified network egress to accommodate the network traffic from the first network path, and providing information associated with the second network path.

20 Claims, 3 Drawing Sheets

METHOD AND SYSTEM FOR NETWORK BACKBONE ANALYSIS

BACKGROUND INFORMATION

Network users require increasing amounts of bandwidth. Corporate users, government users and other large entities may require reserved or dedicated bandwidth to connect multiple locations. Network service providers, network owners and network operators may provide network services offering private networks to such users. Private networks may require a significant amount of bandwidth. Users of private backbones may require a high amount of availability to ensure connectivity between two or more locations. Determining the availability of network services in the event of a failure of one or more components may be difficult. Analysis may focus on core network connectivity and may not provide an end to end picture of the impact of a failure of one or more components. Network service providers may maintain under-utilized and expensive, large capacity network connectivity to attempt to ensure availability for one or more users.

BRIEF DESCRIPTION OF THE DRAWINGS

In order to facilitate a fuller understanding of the exemplary embodiments, reference is now made to the appended drawings. These drawings should not be construed as limiting, but are intended to be exemplary only.

DETAILED DESCRIPTION OF PREFERRED EMBODIMENTS

An exemplary embodiment provides a private network backbone analysis system. The private network backbone analysis system may present a model depicting the impact of a failure of one or more components of a private network backbone.

Figure 1:
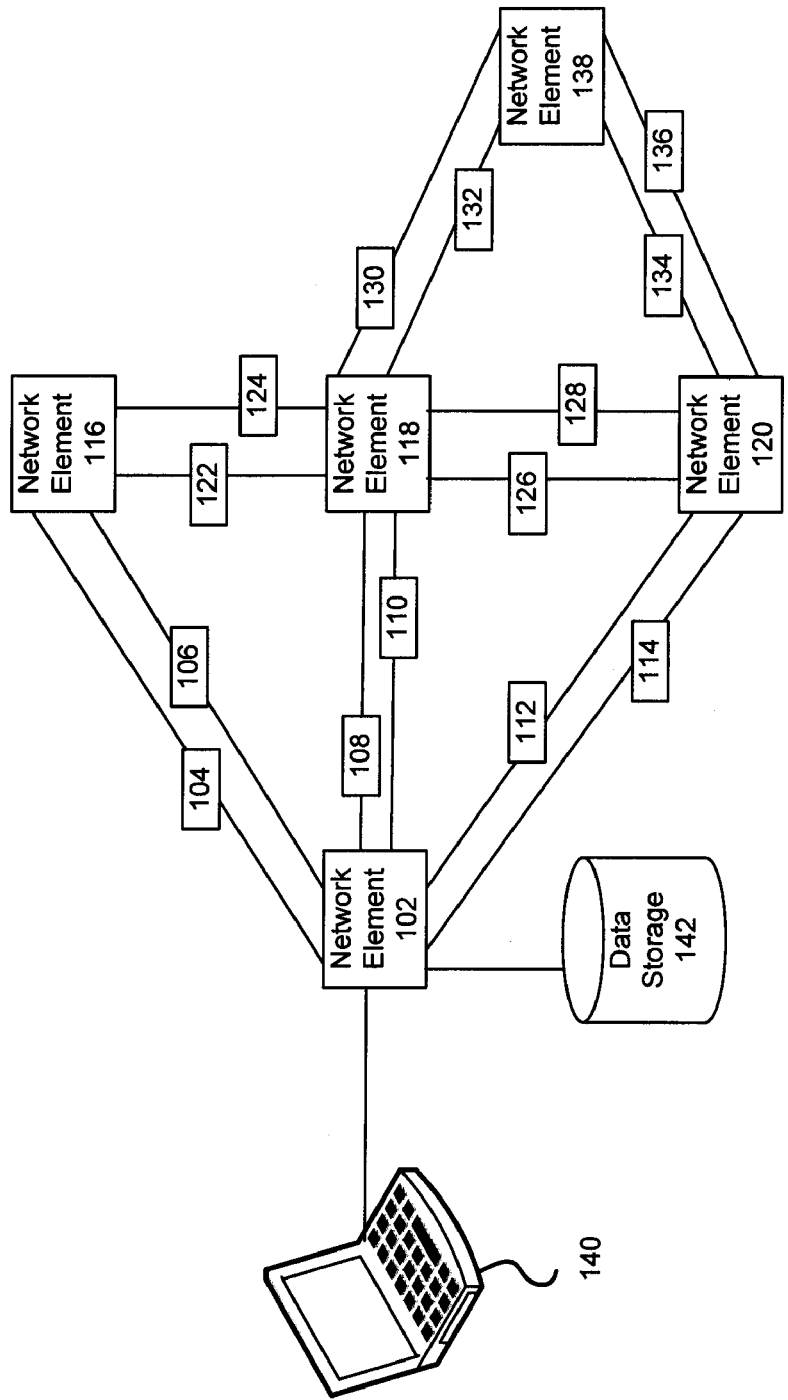
FIG. 1 is a private network analysis system, in accordance with an exemplary embodiment.

Referring to FIG. 1, a private network analysis system in accordance with an exemplary embodiment is illustrated. System 100 illustrates an exemplary system for analyzing a private network backbone. It is noted that System 100 is a simplified view of a network and may include additional elements that are not depicted. As illustrated, network elements 102, 116, 118, 120 and 138 may be communicatively coupled by network links 104, 106, 108, 110, 112, 114, 122, 124, 126, 128, 130, 132, 134 and 136. Network elements 102, 116, 118, 120 and 138 may be communicatively coupled to other devices such as data storage 142 and computer 140.

Network elements 102, 116, 118, 120 and 138 may transmit and/or receive data via network links 104, 106, 108, 110, 112, 114, 122, 124, 126, 128, 130, 132, 134 and 136. The data may be transmitted and/or received utilizing a standard telecommunications protocol or a standard networking protocol. For example, data may be transmitted and/or received using Wireless Application Protocol (WAP), Multimedia Messaging Service (MMS), Enhanced Messaging Service (EMS), Short Message Service (SMS), Global System for Mobile Communications (GSM) based systems, Code Division Multiple Access (CDMA) based systems, Transmission Control Protocol/Internet Protocols (TCP/IP), or other protocols and/or systems suitable for transmitting and receiving data. Data may be transmitted and/or received wirelessly or may utilize cabled network connections or telecom connections such as an Ethernet RJ45/Category 5 Ethernet connection, a fiber connection, a traditional phone wireline connection, a cable connection or other wired network connection. Network elements 102, 116, 118, 120 and 138 may use standard wireless protocols including IEEE 802.11a, 802.11b and 802.11g. Network elements 102, 116, 118, 120 and 138 may also be communicatively coupled via protocols for a wired connection, such as an IEEE Ethernet 802.3.

Network elements 102, 116, 118, 120 and 138 may be one or more routers, switches, hubs, and/or other network connectivity devices. Network elements 102, 116, 118, 120 and 138 may include one or more processors (not shown) for recording, transmitting, receiving and/or storing data. Although network elements 102, 116, 118, 120 and 138 are each depicted as single network connectivity devices, it should be appreciated that the contents of network elements 102, 116, 118, 120 and 138 may be combined into fewer or greater numbers of network connectivity devices and may be connected to one or more data storage systems, such as data storage 142. Furthermore, network elements 102, 116, 118, 120 and 138 may be local, remote, or a combination thereof to each other. Network elements 102, 116, 118, 120 and 138 may be different portions of a network such as edge nodes, core nodes, customer premises equipment, a hubbing node, an edge device, and an integrated access device or other network connectivity devices.

Network elements 102, 116, 118, 120 and 138 may provide Application Programming Interfaces (APIs), interface tables, Remote Procedure Calls (RPCs), web services, Extensible Markup Language (XML) based interfaces, Simple Object Access Protocol (SOAP) based interfaces, Common Request Broker Architecture (CORBA) and other interfaces for sending or receiving network information.

Network links 104, 106, 108, 110, 112, 114, 122, 124, 126, 128, 130, 132, 134 and 136 may be one or more network connections utilized to provide private network connectivity to one or more users. For example, network links 104, 106, 108, 110, 112, 114, 122, 124, 126, 128, 130, 132, 134 and 136 may be network connections utilizing Ethernet, Multiprotocol Label Switching (MPLS) based Ethernet, Asynchronous Transfer Mode (ATM), Synchronous Optical Networking (SONET), Digital Subscriber Line (DSL), Asymmetric Digital Subscriber Line (ADSL), Symmetric Digital Subscriber Line (SDSL), Fiber To The Premises (FTTP), cable modem broadband, leased line, Integrated Services Digital Network (ISDN), dial-up, satellite, wireless networking, broadband over power lines or other network technologies. In some embodiments, network links 104, 106, 108, 110, 112, 114, 122, 124, 126, 128, 130, 132, 134 and 136 may be logically combined using link aggregation such as Ethernet bonding, channel bonding, trunking, port trunking, and/or an IEEE 802.3ad compliant technique.

Data storage 142 may be network accessible storage and may be local, remote, or a combination thereof to network elements 104, 106, 108, 110, 112, 114, 122, 124, 126, 128, 130, 132, 134 and 136. Data storage 142 may utilize a Redundant Array of Inexpensive Disks (RAID), tape, disk, a Storage Area Network (SAN), or other computer accessible storage. Data storage 142 may store network path information identifying one or more network links between one or more network elements. Network path information may include edge network equipment information, core network equipment information, customer premises equipment information, network routing information, a hop count for a network path, bandwidth information associated with a network path, congestion information associated with a network path, latency information associated with a network path, and/or quality of service information associated with a network path.

Data storage 142 may store network traffic information specifying a network ingress and a network egress for network traffic on a private network backbone on a network path. Network traffic information may also specify one or more attributes of the network traffic. Network traffic information may include minimum required bandwidth required for the network traffic, quality of service metrics for the traffic, an ingress point of network traffic, an egress point of network traffic, customer information associated with network traffic and other data.

Data storage 142 may store data received from user input, a network management system, a network provisioning system, a management information base, a network services ordering system, a database, a file, a web service, and/or an application programming interface. In one or more embodiments, data storage 142 may be a management information base or storage associated with a network management system.

Computer 140 may be a desktop computer, a laptop computer, a server or other computer capable of performing private network backbone analysis. Computer 140 may receive data from user input, a network management system, a network provisioning system, a management information base, a network services ordering system, a database, a file, a web service, and/or an application programming interface. Computer 140 may query other systems and/or local or remote storage such as data storage 142 to obtain network information.

Computer 140 may model a network which may provide one or more private network backbones to one or more users. Computer 140 may utilize network path information to create one or more models of network topology including nodes, links, resources and/or other network infrastructure. Computer 140 may model network topology attributes such as the bandwidth of a link, the bandwidth of a node, the bandwidth information associated with a network path, congestion information associated with a network path, latency information associated with a network path, and/or quality of service information associated with a network path. A model may be stored in memory or in other storage, such as data storage 142. Computer 140 may additionally model user traffic on a network. User traffic information in a model may include information for a network path of a private network such as an ingress point, an egress point, a minimum bandwidth, one or more quality of service metrics, and/or other network traffic metrics. Computer 140 may include multiple network paths in a model including primary and secondary network paths from a user traffic origination point or network ingress to a user traffic destination point or network egress.

Computer 140 may provide a user interface to a model. A user interface may enable a user to input data, edit data or view data related to network traffic and/or one or more network paths. Computer 140 may provide an interface for a user to test one or more failure scenarios or perform network analysis of a modeled network and/or user traffic on a modeled network. For example, a user may utilize a model created or maintained by computer 140 to emulate failure of one or more network components. A user may specify a link, a node, or other network component for failure in a model and may utilize the model to assess the impact of the one or more failures. Computer 140 may identify one or more alternate network paths with bandwidth and/or other network characteristics suitable to accommodate network traffic on a network path containing a failed component. Computer 140 may be capable of iterative emulations of failed components and/or identification of one or more alternate paths. For example, network element 102 may be an originating edge node of user traffic logically connected by network links 108, 110, 130 and 132, and network element 118 to network element 138. Network links 108, 110, 130 and 132 may be links carrying user traffic. Network element 118 may be a core network node and network element 138 may be a destination network node. A user may input a command instructing computer 140 to emulate the failure of network link 108 in the model. Computer 140 may emulate the failure of network link 108 and may determine the availability of one or more alternate network paths to accommodate traffic from failed network link 108. Computer 140 may analyze one or more links, nodes or other network components which may provide connectivity between an originating point of the failed network path and a destination point of the failed network path. Computer 140 may produce information related to one or more alternate network paths avoiding the simulated failed component. For example, computer 140 may produce a report, a listing, a display, a text message, an email or otherwise provide a listing of available paths. Available paths may be listed in order of suitability to accommodate network traffic which may be determined by available bandwidth, latency, or other network metrics. Available paths may also be listed in other orders such as alphabetically by node name and/or link name. In some embodiments, only network paths with sufficient bandwidth and/or adequate network characteristics may be listed. For example, network link 110, network element 118 and network link 132 may be listed as an alternate path if the available bandwidth, quality of service, latency, and/or other attributes of this path accommodates the minimum level required for traffic formerly on failed network link 108 to network element 118 and network link 130. Other network paths from the origination node, network element 102, to the destination node, network element 138 may be presented or listed. Network element 102 via network link 112, network element 120 and network link 134 to network element 138 may be listed. This route from originating network element 102 to destination network element 138 may be preferred over a route via network element 116. A route via network element 116 may accommodate the required bandwidth but may add additional latency and thus may be less preferable.

In another example, a failure of network element 118, which may represent a core node in a model, may be simulated. A failure of a component in a network model which handles traffic for multiple network paths and/or multiple links may determine the availability of alternate network paths for one or more of networks utilizing the failed component. For example, the failure of network element 118 may affect network links 108, 110, 122, 124, 126, 128, 130 and 132. For network traffic originating at network element 102 utilizing network links 108, 110, 130 and 132 with a destination of network element 138, computer 140 may provide a route utilizing network element 120 and network links 112 and 134 if bandwidth and/or other characteristics meet network traffic requirements. This may utilize network element 120 instead of failed network element 118. One or more links, such as network links 108, 110, 122, 124, 126, 128, 130 and 132 may be routed individually. Computer 140 may utilize a locking mechanism on data or records utilized to manage bandwidth of available network routes in a model. This may ensure that bandwidth is properly reserved. For example, this may ensure that multiple processes, each routing a traffic from a different failed network path, do not improperly assign network traffic to a route which is not capable of accommodating the traffic.

In some embodiments, if a model is not able to find sufficient network resources to accommodate traffic from a failed route an error may occur. The error may provide a name of a failed component, a failed network path and/or other error details. An error message may provide a listing of one or more network paths affected by a failed component, such as a node or a link, which may be sorted by origination, destination, traffic characteristics, associated customer information, or other information. Error messages may be provided as displays on computer 140, as reports, printouts, emails, text messages and other electronic communications.

In some embodiments, a error message may provide a listing of available paths which were not adequate to accommodate network traffic from a failed path. For example, if a failed path required 20 gigabit per second bandwidth, a listing in an error report may identify one or more network paths with less bandwidth. In one or more embodiments, a user may choose to model the effects of transitioning to a network path with less bandwidth, with a lower quality of service, a higher latency or other network attributes different from the failed network path.

In one or more embodiments, computer 140 may identify multiple paths in a model which cumulatively may accommodate traffic from a single failed network path. For example, computer 140 may model network link 110 as a failed 20 Gbps network link utilized for traffic from an origination point at network element 102 to a destination point at network element 138. Network links 108, 112, 130 and 134 may be 10 Gbps network links. Computer 140 may determine that a single network link is not available to accommodate 20 Gbps of network traffic. Computer 140 may model splitting the traffic into two 10 Gbps network paths utilizing network links 108, 112, 130 and 134.

In one or more embodiments, computer 140 may model network information of a theoretical or planned network based on inputs received without requiring the existence of the modeled actual network. This may enable network planning, budgeting and/or other analysis. Computer 140 may enable the modeling of an existing network and may allow the addition of theoretical or planned links, nodes, network traffic and/or other network information.

A model created by computer 140 may enable actions including the splitting of traffic among multiple network paths, the routing of traffic on a network path with reduced bandwidth, and/or the dropping or failure of network traffic depending on preferences of a user, of a model, requirements of network traffic or other conditions.

The various components of system 100 as shown in FIG. 1 may be further duplicated, combined and/or integrated to support various applications and platforms. Additional elements may also be implemented in the systems described above to support various applications.

Figure 2:
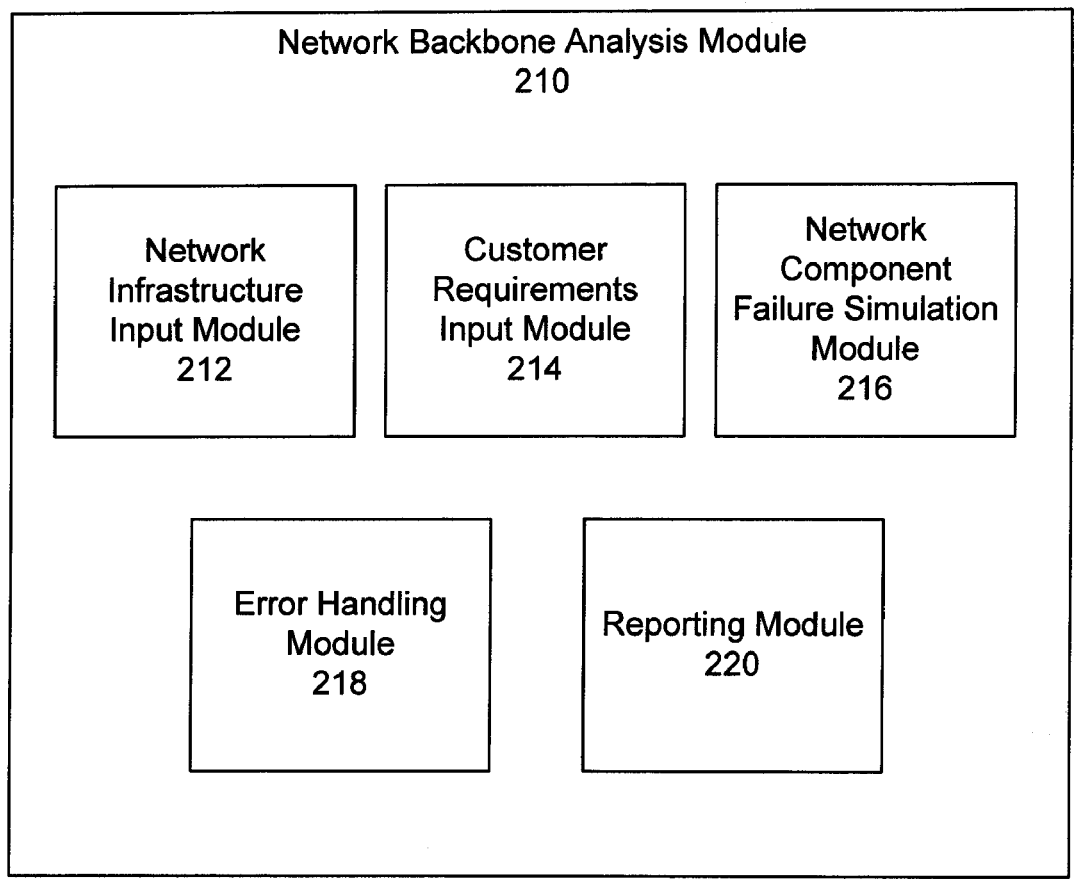
FIG. 2 depicts a module for analyzing a private network, in accordance with an exemplary embodiment.

Referring to FIG. 2, a network backbone analysis module 210 for analyzing a private network is depicted, in accordance with an exemplary embodiment. As illustrated, network backbone analysis module 210 may contain one or more components including network infrastructure input module 212, customer requirements input module 214, network component failure simulation module 216, error handling module 218, and reporting module 220. Network backbone analysis module 210 may create, manage and utilize one or more network models which may utilize a server, a desktop, a laptop, in a database, memory or another electronic storage medium. Network backbone analysis module 210 may enable the display and manipulation of one or more network models via one or more user interfaces. Network backbone analysis module 210 may enable the creation and manipulation of model preferences, model settings and/or other model attributes.

Network infrastructure input module 212 may receive data such as network path information and network infrastructure information. Network path information may identify one or more network paths between one or more network elements. Network path information may include edge network equipment information, core network equipment information, customer premises equipment information, network routing information, a hop count for a network path, bandwidth information associated with a network path, congestion information associated with a network path, latency information associated with a network path, and/or quality of service information associated with a network path.

Customer requirements input module 214 may receive data such as network traffic information and customer and/or user information. Network traffic information may specify a network ingress, a network egress and a network path for network traffic of a private network backbone. Network traffic information may also specify one or more attributes of the network traffic. Network traffic information may include minimum required bandwidth required for the network traffic, quality of service metrics for the traffic, an ingress point of network traffic, an egress point of network traffic, customer information associated with network traffic and other data.

Network component failure simulation module 216 may enable a user of a model to emulate the failure of one or more network components independently, serially, and/or concurrently. Network component failure simulation module 216 may accept user input specifying one or more components to fail and may analyze and provide feedback on the impact of the failure of the one or more failed components. Network component failure simulation module 216 may provide alternative network paths to a network path containing a failed component enabling a user to identify redundancy. Network component failure simulation module 216 may accept inputs and/or analyze customer or network traffic requirements for network traffic utilizing a failed component when identifying alternative network paths. A user may utilize network component failure simulation module 216 to analyze the feasibility of rerouting multiple private backbones. For example, if network link 110 is a 20 Gbps link which fails, network component failure simulation module 216 may identify network links 112 as 20 Gbps link of which only 10 Gbps may currently be utilized. Network link 114 may be an unutilized 10 Gbps link. Network component failure simulation module 216 may determine the feasibility of transferring network traffic from network link 112 to 114 in order to enable network link 112 to accommodate the 20 Gbps of network traffic from failed network link 110. Network component failure simulation module 216 may also enable a portion of network traffic from a network path containing a failed component to be routed over an alternate network path with less bandwidth. Network component failure simulation module 216 may enable network traffic to be split and routed on multiple network paths to accommodate a network outage.

Error handling module 218 may respond to one or more errors created by a failure of a network component. Error handling module 218 may enable error trapping of an error and one or more error handling actions. In some embodiments, error handling module 218 may provide information about a failed network component such as a link or a node. Error handling module 218 may provide information about one or more network paths or links utilizing a failed network component, network traffic utilizing one or more network paths affected by a failed component, and/or users associated with network traffic on affected network paths.

Reporting module 220 may receive, transmit, analyze and report on network model data. Reporting module 220 may receive near real time data or may access stored data. Reports and/or analysis may be standard reports scheduled as part of a network modeling or testing process or may be customized reports and/or analysis requested by a user. Reports may be provided and delivered in a variety of formats including email, web, electronic message, printout and other formats. Reports may include information on network infrastructure, network traffic, users associated with network traffic, and/or errors.

Network backbone analysis module 210 may contain fewer or greater numbers of modules. Modules may be combined. Modules may be local or remote to one another and may be implemented on different computing platforms which may be communicatively coupled. Modules may be implemented in software and/or hardware.

Figure 3:
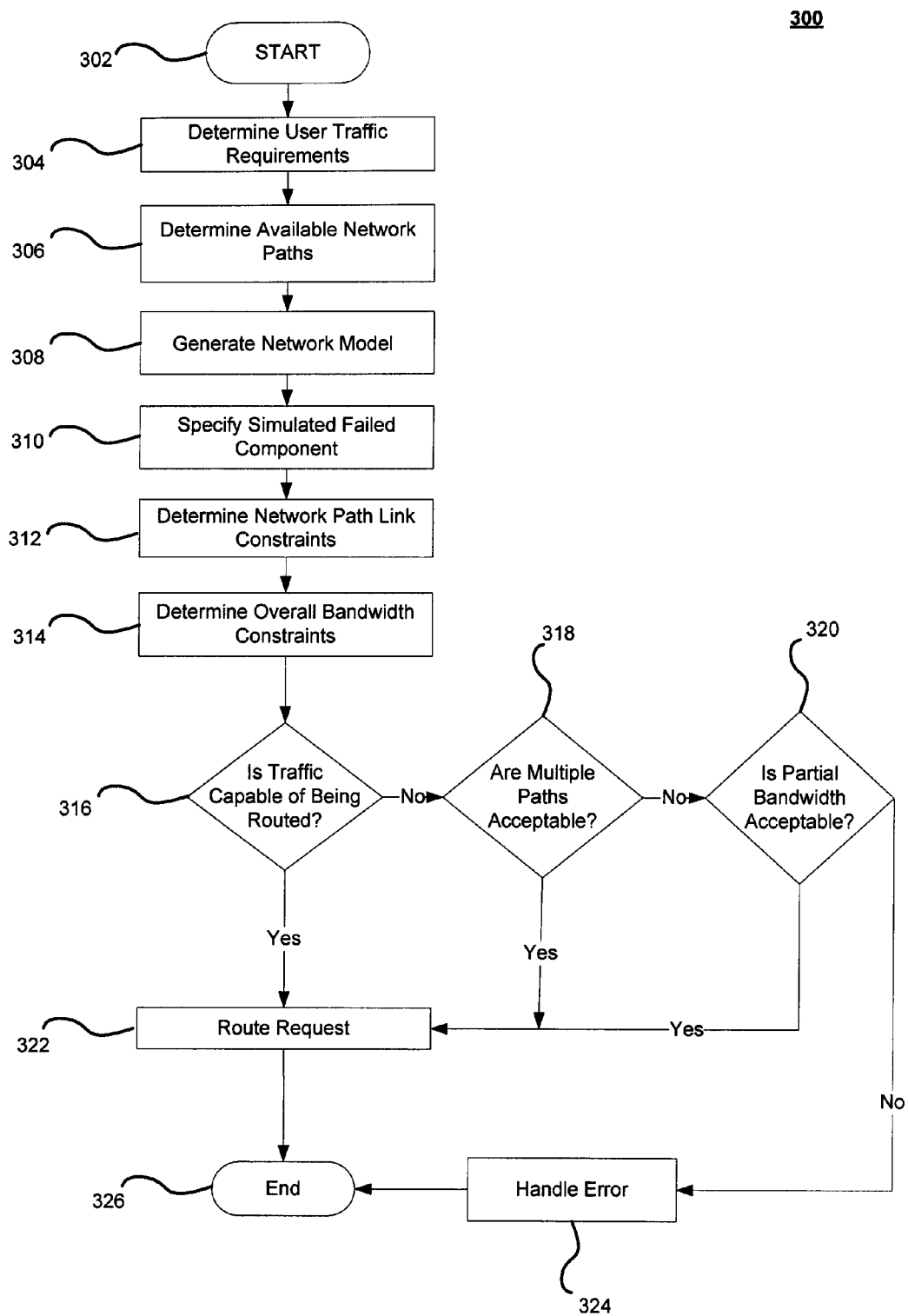
FIG. 3 depicts a method for analyzing a private network, in accordance with an exemplary embodiment.

FIG. 3 illustrates a flow diagram of a method 300 for analyzing a private network, in accordance with exemplary embodiment. This exemplary method 300 is provided by way of example, as there are a variety of ways to carry out the method. The method 300 shown in FIG. 3 can be executed or otherwise performed by one or a combination of various systems. The method 300 is described below may be carried out by the private network analysis system 100 shown in FIG. 1 and network backbone analysis module 210 for analyzing a private network shown in FIG. 2 by way of example, and various elements of the FIGS. 1 and 2 are referenced in explaining exemplary method 300 of FIG. 3. Each block shown in FIG. 3 represents one or more processes, methods or subroutines carried out in exemplary method 300. Referring to FIG. 3, exemplary method 300 may begin at block 302.

At block 304, the method 300 may determine user traffic requirements. Data may be input by a user specifying a number of network paths providing private network backbones or other connectivity to one or more users. User traffic requirements may specify origination points or network ingresses for user traffic and destination points or network egresses for network traffic. User traffic requirements may specify one or more network parameters required or desired for network connectivity such as a minimum bandwidth, a quality of service metric, a latency metric or other network connectivity measurement metrics. User traffic requirements may specify a primary routing for one or more private backbones and a plurality of secondary routings for the one or more private backbones. Routings may include node names, link names, bandwidth, and other characteristics. Routing information may include priority or ranking information indicating a preference for a routing. In some embodiments, network traffic data may be queried from one or more databases, provided by one or more feeds from external systems, or queried using an API to an external system. For example, data may be received from a network ordering or provisioning system which may provide information related to user traffic to be modeled. This may enable provisioning and/or capacity planning determinations to be made once an order has been received. It may enable planning for network redundancy once user traffic has been provisioned on a network.

At block 306, network infrastructure including available network paths may be determined. Data may be input regarding core nodes, edge nodes, customer premises equipment, links, ports, and other network infrastructure data. Data may also be received via an interface, queried from one or more databases or accessed via one or more Application Programming Interfaces (APIs).

At block 308, one or more network models may be created utilizing data on network infrastructure, available network paths, user traffic requirements and other network data. A model may provide one or more user interfaces and/or APIs to access the model.

At block 310, one or more simulated failed network components may be specified. A user may utilize an API or a user interface to identify a component of a network path such as a link or a node to emulate as failed in a network model.

At block 312, network path link constraints may be determined. The bandwidth constraints, or other network connectivity constraints may be determined for one or more links of a network path.

At block 314, the overall network path constraints may be determined for one or more network paths. Method 300 may utilize the model to determine the bandwidth and other constraints for one or more network paths. The bandwidth and other constraints for the components of a network path, such as one or more nodes, one or more links between nodes, ports, customer premises equipment and other infrastructure utilized by a path may be determined. A maximum bandwidth, quality of service, latency and/or other metrics for one or more links or components of a network path may be determined.

At block 316, it may be determined whether traffic from a failed network path is capable of being routed on an alternate network path. If network traffic from a failed network path may be routed on an alternate network path, the method may continue at block 322. If network traffic from a failed network path may be not routed on an alternate network path, the method may continue at block 318.

At block 318, the method may determine whether network traffic from a failed network path may be split and routed on multiple alternate network paths. If multiple alternate network paths are acceptable, the method may continue at block 322. If multiple alternate network paths are not acceptable, the method may continue at block 320.

At block 320, the method may determine whether routing a portion of network traffic on one or more alternate network paths is acceptable. If routing a portion of network traffic from a failed network route is acceptable the method may continue at block 322. If partial routing of network traffic is not acceptable the method may continue at block 324.

At block 322, the network traffic from a failed network path may be routed on one or more alternate network paths.

At block 324, one or more errors resulting from failed network components may be handled. Error notifications and reporting may be provided. Notifications and reporting may identify one or more failed network components, failed network paths, affected customers, and available network resources.

At block 326, the method may end.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A method, comprising:
    receiving network information identifying one or more network paths on a first network;
    receiving network traffic information specifying a network ingress and a network egress for the network traffic on a first network path of the one or more identified network paths, wherein the network traffic information specifies one or more attributes of the network traffic on the first network;

generating, using at least one computer processor, a modeled network based on the received network information;

identifying, using at least one computer processor, one or more simulated network components;

emulating failure of the one or more simulated network components of the first network path on the modeled network independent of actual network performance of the first network, in response to a user input;

determining, using at least one computer processor, network path link constraints and bandwidth constraints for the one or more network paths;

determining, using at least one computer processor, a second network path and one or more additional network paths between the specified network ingress and the specified network egress to accommodate the emulated failure and the network traffic from the first network path; and providing information associated with the second network path and one or more additional network paths in order of suitability to a user.

2. The method of claim 1, wherein determining a second network path and one or more additional network paths further comprises identifying a plurality of network paths with a cumulative bandwidth sufficient for the traffic of the first network path to accommodate the network traffic of the first network path in the event a single second network path is unavailable to accommodate the network traffic of the first network path.

3. The method of claim 1, wherein the one or more components of the first network path comprise at least one of a network link, a network node, and customer premises equipment.

4. The method of claim 1, wherein the network information includes at least one of edge network equipment information, core network equipment information, customer premises equipment information, network routing information, a hop count for a network path, bandwidth information associated with a network path, congestion information associated with a network path, latency information associated with a network path, and quality of service information associated with a network path.

5. The method of claim 1, wherein the one or more attributes of the network traffic comprise at least one of: a minimum required bandwidth required for the network traffic and a quality of service metric for the traffic.

6. The method of claim 1, further comprising providing error information to a user in the event a second network path is unavailable to accommodate network traffic of the first network path.

7. The method of claim 1, wherein determining a second network path identifies a network path with bandwidth less than the first network path in the event a network path with sufficient bandwidth for the traffic of the first network path is unavailable.

8. The method of claim 1, wherein the network ingress comprises at least one of a hubbing node, customer premises equipment, an edge device, and an integrated access device.

9. The method of claim 1, wherein the network egress comprises at least one of a hubbing node, customer premises equipment, an edge device, and an integrated access device.

10. The method of claim 1, wherein the network path information is received from at least one of user input, a network management system, a network provisioning system, a management information base, a network services ordering system, a database, a file, a web service, and an application programming interface.

11. The method of claim 1, wherein the network traffic information is received from at least one of user input, a network management system, a network provisioning system, a management information base, a network services ordering system, a database, a file, a web service, and an application programming interface.

12. A non-transitory electronic storage medium comprising code to perform the acts of the method of claim 1.

13. A system, comprising:
a database for storing network path information and network traffic information of a first network; and
a processor, wherein the processor is configured to:
receive network information identifying one or more network paths on a first network;
receive network traffic information specifying a network ingress and a network egress for the network traffic on a first network path of the one or more identified network paths, wherein the network traffic information specifies one or more attributes of the network traffic on the first network;
generate a modeled network based on the received network information;
identify one or more simulated network components;
emulate failure of the one or more simulated network components of the first network path on the modeled network independent of actual network performance of the first network, in response to a user input;
determine network path link constraints and bandwidth constraints for the one or more network paths;
determine a second network path and one or more additional network paths between the specified network ingress and the specified network egress to accommodate the emulated failure and the network traffic from the first network path; and
provide information associated with the second network path and one or more additional network paths in order of suitability to a user.

14. The system of claim 13, wherein at least one of the second network path and the one or more additional network paths comprises a path utilizing a plurality of network links to accommodate the network traffic from the first path.

15. The system of claim 13, wherein the one or more components of the first network path comprise at least one of a network link, a network node, and customer premises equipment.

16. The system of claim 13, wherein the network information includes at least one of edge network equipment information, core network equipment information, customer premises equipment information, network routing information, a hop count for a network path, bandwidth information associated with a network path, congestion information associated with a network path, latency information associated with a network path, and quality of service information associated with a network path.

17. The system of claim 13, wherein the one or more attributes of the network traffic comprise at least one of: a minimum required bandwidth required for the network traffic and a quality of service metric for the traffic.

18. The system of claim 13, wherein the processor is further configured to identify a plurality of network paths with a cumulative bandwidth sufficient for the traffic of the first network path to accommodate the network traffic of the first network path in the event a single second network path is unavailable to accommodate network traffic of the first network path.

19. The system of claim 13, wherein the processor is further configured to identify a second network path with bandwidth less than the first network path in the event a network path with sufficient bandwidth for the traffic of the first network path is unavailable.

20. The system of claim 13, wherein the processor is further configured to provide error information to a user in the event a second network path is unavailable to accommodate network traffic of the first network path.

* * * * *